United States Patent
Nakane et al.

(10) Patent No.: US 9,440,670 B2
(45) Date of Patent: Sep. 13, 2016

(54) BRACKET FOR SUPPORT STRUCTURE FOR STEERING COLUMN, AND SUPPORT STRUCTURE FOR STEERING COLUMN

(71) Applicant: FUTABA INDUSTRIAL CO., LTD., Aichi (JP)

(72) Inventors: Shinichiro Nakane, Aichi (JP); Hiroki Ishihara, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 14/438,815

(22) PCT Filed: Oct. 2, 2013

(86) PCT No.: PCT/JP2013/076842
§ 371 (c)(1),
(2) Date: Apr. 27, 2015

(87) PCT Pub. No.: WO2014/065089
PCT Pub. Date: May 1, 2014

(65) Prior Publication Data
US 2015/0298720 A1    Oct. 22, 2015

(30) Foreign Application Priority Data
Oct. 26, 2012    (JP) ................................ 2012-236891

(51) Int. Cl.
*B62D 1/16*    (2006.01)
*B62D 25/14*    (2006.01)

(52) U.S. Cl.
CPC .............. *B62D 1/16* (2013.01); *B62D 25/145* (2013.01)

(58) Field of Classification Search
CPC ........ B62D 1/16; B62D 1/195; B62D 1/163; B62D 25/147

USPC ................................... 280/779; 74/492, 493
See application file for complete search history.

(56) References Cited

U.S. PATENT DOCUMENTS 4,355,820 A * 10/1982 Kitagawa ............ B62D 25/145
 280/779
4,682,788 A * 7/1987 Yoshimura ........... B62D 25/145
 280/779

(Continued)

FOREIGN PATENT DOCUMENTS

DE    4231497 A1    3/1994
DE    19547858 C1    7/1997

(Continued)

OTHER PUBLICATIONS

International Search Report dated Oct. 29, 2013 for corresponding International Application No. PCT/JP2013/076842, filed Oct. 2, 2013.

(Continued)

*Primary Examiner* — Toan To
(74) *Attorney, Agent, or Firm* — David D. Brush; Westman, Champlin & Koehler, P.A.

(57) ABSTRACT

A bracket is used in a support structure for a steering column. The support structure includes an instrument panel reinforcement, a steering support bracket, and a floor brace. In one aspect, the bracket includes a first portion and a second portion, which are configured to be arranged spanning between the steering support bracket and the floor brace. The first portion is arranged between the steering support bracket and the floor brace at a first angle with respect to horizontality. The second portion is arranged between the steering support bracket and the floor brace at a second angle, which is different from the first angle.

7 Claims, 6 Drawing Sheets

(56) References Cited

U.S. PATENT DOCUMENTS

| | | | | |
|---|---|---|---|---|
| 5,810,393 A | * | 9/1998 | Joest | B62D 25/145 |
| | | | | 280/750 |
| 8,342,599 B2 | | 1/2013 | Atsumi et al. | |
| 2002/0056982 A1 | * | 5/2002 | Brownlee | B62D 1/16 |
| | | | | 280/779 |
| 2009/0008956 A1 | * | 1/2009 | Scheib | B62D 25/142 |
| | | | | 296/70 |
| 2011/0233964 A1 | | 9/2011 | Matsutani et al. | |
| 2012/0049574 A1 | | 3/2012 | Atsumi et al. | |
| 2013/0076016 A1 | | 3/2013 | Aoki | |

FOREIGN PATENT DOCUMENTS

| | | |
|---|---|---|
| JP | 57017870 U | 1/1982 |
| JP | H09188276 A | 7/1997 |
| JP | 2003127905 A | 5/2003 |
| JP | 2003212150 A | 7/2003 |
| JP | 2004034927 A | 2/2004 |
| JP | 2008037198 A | 2/2008 |
| JP | 2009262703 A | 11/2009 |
| JP | 2010126140 A | 6/2010 |
| JP | 4570724 B2 | 10/2010 |
| JP | 2011088471 A | 5/2011 |
| JP | 2012046002 A | 3/2012 |
| WO | 2011155031 A1 | 12/2011 |

OTHER PUBLICATIONS

International Preliminary Report on Patentability and English translation of the Written Opinion dated Apr. 28, 2015 for corresponding International Application No. PCT/JP2013/076842, filed Oct. 2, 2013.

Canadian Office Action dated Apr. 13, 2016 for Canadian Patent Application No. 2,889,493 A1, filed Apr. 24, 2015.

English translation of Chinese Office Action dated Apr. 6, 2016 for corresponding Chinese Application No. 2013800557555.

English translation of a Japanese Office Action dated May 31, 2016 for corresponding Japanese Application No. 2012-236891.

English translation of a Korean Notice of Preliminary Rejection dated Jun. 3, 2016 for corresponding Korean Application No. 10-2015-7013654, filed May 22, 2015.

Extended European Search Report dated Jun. 1, 2016 for corresponding European Application No. 13848747.5.

* cited by examiner

A ARROW VIEW

B ARROW VIEW

C ARROW VIEW

| | AMOUNT OF DISPLACEMENT (mm) | STIFFNESS VALUE (N/mm) | PERFORMANCE EFFECT (N/mm) | EFFECT (%) |
|---|---|---|---|---|
| 0° | 0.00572 | 175 | – | 100% |
| 5° | 0.00571 | 175 | 0 | 100% |
| 10° | 0.0057 | 175 | 1 | 100% |
| 15° | 0.00556 | 180 | 5 | 103% |
| 20° | 0.00554 | 181 | 6 | 103% |
| 25° | 0.00553 | 181 | 6 | 103% |
| 30° | 0.00552 | 181 | 6 | 104% |
| 35° | 0.00552 | 181 | 6 | 104% |
| 40° | 0.00551 | 181 | 7 | 104% |
| 45° | 0.00548 | 182 | 8 | 104% |
| 50° | 0.00543 | 184 | 9 | 105% |
| 55° | 0.00539 | 186 | 11 | 106% |
| 60° | 0.00534 | 187 | 12 | 107% |
| 65° | 0.0053 | 189 | 14 | 108% |
| 70° | 0.00515 | 194 | 19 | 111% |
| 75° | 0.00506 | 198 | 23 | 113% |
| 80° | 0.00509 | 196 | 22 | 112% |

BRACKET FOR SUPPORT STRUCTURE FOR STEERING COLUMN, AND SUPPORT STRUCTURE FOR STEERING COLUMN

CROSS-REFERENCE TO RELATED APPLICATIONS

This Application is a Section 371 National Stage Application of International Application No. PCT/JP2013/076842, filed Oct. 2, 2013, the content of which is incorporated herein by reference in its entirety, and published as WO 2014/065089 on May 1, 2014, not in English, the International Application claiming the benefit of Japanese Patent Application No. 2012-236891 filed Oct. 26, 2012 in the Japan Patent Office, and the entire contents of Japanese Patent Application No. 2012-236891 are incorporated herein in their entirety.

TECHNICAL FIELD

The present invention relates to a bracket for use in a support structure that supports a steering column of a vehicle, and the support structure.

BACKGROUND ART

Generally, in a vehicle, a steering column that forms a part of a steering is supported, via a steering support bracket, by an instrument panel reinforcement arranged spanning in a vehicle width direction (a left-right direction of the vehicle) inside an instrument panel (dashboard) of the vehicle (see Patent Document 1, for example). The steering column is a member that transmits to wheels a steering operation of a steering wheel held and operated by a driver.

In Patent Document 1, for the purpose of reducing flexure and vibration of the instrument panel reinforcement (and thus, reducing vibration of the steering wheel by improving support stiffness of the steering column), a brace is provided, with an upper end thereof fixed to the steering support bracket and a lower end thereof fixed to a floor of a vehicle body frame or to a lower portion of a front pillar.

Structures for reducing vibration of the steering wheel are also described in Patent Documents 2 to 4, etc.

Specifically, Patent Document 2 discloses a structure in which a vertical pipe is provided in addition to the brace. The vertical pipe, with an upper end thereof fixed to a steering support and a lower end thereof mounted to the floor of the vehicle body frame, is configured to be able to support the steering support. The steering support is also supported by the vertical pipe, and thus, the support stiffness of the steering column connected to the steering support is improved, thereby enabling reduction of vibration of the steering wheel.

Patent Document 3 discloses a structure in which a steering support member (corresponding to the instrument panel reinforcement) is configured with two support members arranged side by side in parallel to each other. Due to such a structure in which the steering support member is configured with the two support members, stiffness of the steering support member as a whole can be improved, and thus, the support stiffness of the steering column is improved, thereby enabling reduction of vibration of the steering wheel.

Patent Document 4 discloses a structure in which the steering support bracket and the brace are connected to each other via a bracket.

PRIOR ART DOCUMENTS

Patent Documents

Patent Document 1: International Patent Application Publication No. 2011/155031
Patent Document 2: Japanese Unexamined Patent Application Publication No. 2003-212150
Patent Document 3: Japanese Unexamined Patent Application Publication No. 2012-046002
Patent Document 4: Japanese Unexamined Patent Application Publication No. 2003-127905

SUMMARY OF THE INVENTION

Problems to be Solved by the Invention

In the technique in the above Patent Document 1, some effects are expected in that flexure and vibration of the instrument panel reinforcement can be reduced by supporting the instrument panel reinforcement via the brace. However, no attention is paid to a connection state between the instrument panel reinforcement and the steering support bracket, and if there is any problem in such connection, an appropriate reduction of vibration of the steering wheel is not guaranteed.

According to the technique in the above Patent Document 2, the above-described problem in Patent Document 1 may be able to be avoided by supporting the steering support also via the vertical pipe. However, the technique in Patent Document 2 additionally requires a space for providing the vertical pipe and, as a result, can lead to an increase in weight of a support structure as a whole, and thus, in weight of the vehicle as a whole. In recent vehicles, the number of in-vehicle components has increased with enhanced functionality, and an installation space is thereby limited more severely. In addition, improvement in fuel economy is also recognized as an important subject in the context of environmental concerns. However, the technique in Patent Document 2 does not attend to such subjects.

According to the technique in Patent Document 3, the stiffness of the steering support member as a whole may be able to be improved due to the structure in which the steering support member is configured with the two support members. However, problems similar to those in the techniques in the above Patent Documents 1 and 2 may arise.

In the above Patent Document 4, nothing is specified about a specific structure relating to the connection between the steering support bracket and the brace, or in other words, a specific shape and structure of the bracket connecting the both to each other. In this regard, the extent of the effect and a technical significance are unknown.

As above, although the structures and techniques for reducing vibration of the steering wheel by improvement of the support stiffness of the steering column have been proposed variously, they have merits and demerits, and further improvement is strongly anticipated.

It is preferred to provide a more excellent bracket for the support structure for the steering column not only in terms of more appropriate reduction of vibration of the steering wheel but also in terms of reduction in space and weight (and thus, improvement in fuel economy) required of the vehicle.

Means for Solving the Problems

The present invention in one aspect made as a result of the applicant's earnest study relates to a bracket used in a support structure for a steering column. The support structure comprises an instrument panel reinforcement arranged spanning in a vehicle width direction of a vehicle; a steering support bracket for fixing a steering column of the vehicle to the instrument panel reinforcement; and a floor brace fixed at an upper end thereof to the instrument panel reinforcement or to the steering support bracket, and fixed at a lower end thereof to a floor of the vehicle. The bracket is configured to be arranged spanning between the steering support bracket and the floor brace, and comprises a first portion arranged between the steering support bracket and the floor brace at a first angle with respect to horizontality; and a second portion arranged between the steering support bracket and the floor brace at a second angle, which is different from the first angle.

According to the bracket of the present invention in one aspect as above, the steering support bracket can be supported by the floor brace via the bracket. In addition, the steering support bracket is fixed to the instrument panel reinforcement (supported by the instrument panel reinforcement), as well as can be supported by the floor brace. Thus, according to the bracket of the present invention in one aspect, firmer support of the steering support bracket can be achieved.

Moreover, according to the present invention in one aspect, an action and an effect as below can be obtained by including the first portion and the second portion, which are arranged at different angles from each other. Specifically, from among the first portion and the second portion, the portion connected at a more horizontal angle contributes to an improvement of support stiffness in a horizontal direction (a front-rear direction of the vehicle or a left-right direction of the vehicle). In contrast, from among the first portion and the second portion, the portion connected at a more vertical angle contributes to an improvement of support stiffness in a vertical direction (an up-down direction of the vehicle). In this way, the first portion and the second portion each contribute to the improvement of support stiffness effectively, and as a result, support stiffness of the steering support bracket as a whole can be improved effectively.

Consequently, the steering column supported by the steering support bracket also can be supported more firmly, and a much enhanced effect can be obtained in terms of support. That is, according to the bracket of the present invention in one aspect, an effect of improving support stiffness of the steering column (an inhibiting effect on vibration of a steering wheel) is very high.

The bracket of the present invention in one aspect as above is preferred to include the portions arranged between and connected to the steering support bracket and the floor brace at different angles from each other. For example, the bracket of the present invention in one aspect can produce a desired effect if the entirety (outer shape) thereof is configured to have a triangle-like shape.

The bracket of the present invention in one aspect may be understood to have a function of supporting the steering support bracket by taking advantage of (utilizing) stiffness possessed by the floor brace. According to the bracket of the present invention in one aspect, the high effect as described above is produced by a simple configuration in which the floor brace and the steering support bracket are connected to each other. Thus, the bracket of the present invention in one aspect can be applied even in a limited installation space in the vehicle. In addition, the bracket of the present invention in one aspect does not lead to unnecessary increase in weight of the support structure as a whole, and thus, in weight of the vehicle as a whole.

The bracket of the present invention in one aspect may comprise a connection portion to be connected to the steering support bracket, and may have a bifurcated shape that is bifurcated from the connection portion into the first portion and the second portion.

According to such a configuration, a location between the first portion and the second portion can be an empty space, and thus, unnecessary increase in weight of the bracket can be avoided. In other words, reduction in weight of the bracket can be sought easily.

In the bracket of the present invention in one aspect, the first portion and the second portion may form a configuration bifurcated at an angle in a range of 15 degrees to 80 degrees therebetween. Preferably, the angle is 75 degrees.

When the angle formed between the first portion and the second portion is in the range of 15 degrees to 80 degrees, the improvement of support stiffness in the horizontal direction (the left-right direction of the vehicle) and the improvement of support stiffness in the vertical direction (the up-down direction of the vehicle) are kept balanced, thereby enhancing the effect of improvement of support stiffness of the steering support bracket as a whole (and thus, improvement of support stiffness of the steering column). Besides, such an effect can be obtained more reliably. Thus, the inhibiting effect on vibration of the steering wheel can be further improved.

In the bracket of the present invention in one aspect, the first angle may be parallel to the steering column. The purport of this is that, when the bracket of the present invention in one aspect is in a proper use state (specifically, when the bracket is mounted, in the support structure, so as to connect the steering support bracket and the floor brace to each other), the first angle is an angle approximately identical to an arrangement angle of the steering column. In this case, the first portion contributes to an improvement of support stiffness of the steering column in an arrangement direction of the steering column (a direction in which the steering column extends).

In such a case, the second portion arranged at the second angle, which is different from the first angle, is supposed to make a greater contribution to an improvement of support stiffness in a vertical direction (the up-down direction of the vehicle).

Meanwhile, in some vehicles, a protection member that protects knees of a driver at the time of occurrence of a collision accident is provided in a region corresponding to a position of the knees of the driver sitting on a driver's seat of the vehicle. Specifically, in some cases, the protection member is provided in advance to a portion approximately corresponding to the position of the knees of the driver in order to avoid allowing an unintended part of the vehicle to hit the knees of the driver hard due to an impact from the collision at the time of occurrence of a collision accident.

The bracket of the present invention in one aspect may be configured such that at least part of the second portion is arranged in the region corresponding to the position of the knees of the driver sitting on the driver's seat of the vehicle.

This enables the second portion to double as the above-described protection member (or as a bracket for mounting other protector). Thus, it is not necessary to separately provide a protection member (or the bracket for mounting the protector) having a function of protecting the knees of the driver. This can contribute to reduction in the number of components in the vehicle, reduction in weight of the vehicle as a whole, and so on.

In the bracket of the present invention in one aspect, the first portion may have a linear shape. Furthermore, the second portion may have a linear shape.

When the first portion and the second portion have a linear shape, flexure of the first portion and the second portion can be reduced to the minimum. In addition, strength against a pressing force and a tensile force in a linear direction can be maximized. Thus, the above-described configuration is preferable in terms of improvement of support stiffness.

In one aspect, the present invention may be understood as a support structure that supports a steering column of a vehicle. Specifically, the present invention in one aspect may be understood as the support structure for the steering column that comprises an instrument panel reinforcement arranged spanning in a vehicle width direction of the vehicle; a steering support bracket for fixing the steering column to the instrument panel reinforcement; a floor brace fixed at an upper end thereof to the instrument panel reinforcement or to the steering support bracket, and fixed at a lower end thereof to a floor of the vehicle; and a bracket configured to be arranged spanning between the steering support bracket and the floor brace. The bracket comprises a first portion arranged between the steering support bracket and the floor brace at a first angle with respect to horizontality; and a second portion arranged between the steering support bracket and the floor brace at a second angle, which is different from the first angle.

According to the support structure of the present invention in one aspect, the same effects as those described above regarding the bracket of the present invention can be obtained.

An embodiment of the present invention will be described below with reference to drawings.

EXPLANATION OF REFERENCE NUMERALS

1 . . . support structure, 3 . . . steering, 4 . . . steering wheel, 5 . . . steering column, 10 . . . instrument panel reinforcement, 12 . . . cowl-to-brace, 14 . . . steering support bracket, 16 . . . floor brace, 17 . . . fixed end, 18 . . . bracket, 20 . . . flange portion, 30, 32 . . . flat plate portion, 34 . . . receiving portion, 40, 42 . . . side wall, 44, 46 . . . engaging portion, 60 . . . fastening member, 70 . . . lower spanning portion, 72 . . . upper spanning portion, 100, 110 . . . mounting bracket

MODE FOR CARRYING OUT THE INVENTION

Figure 1:
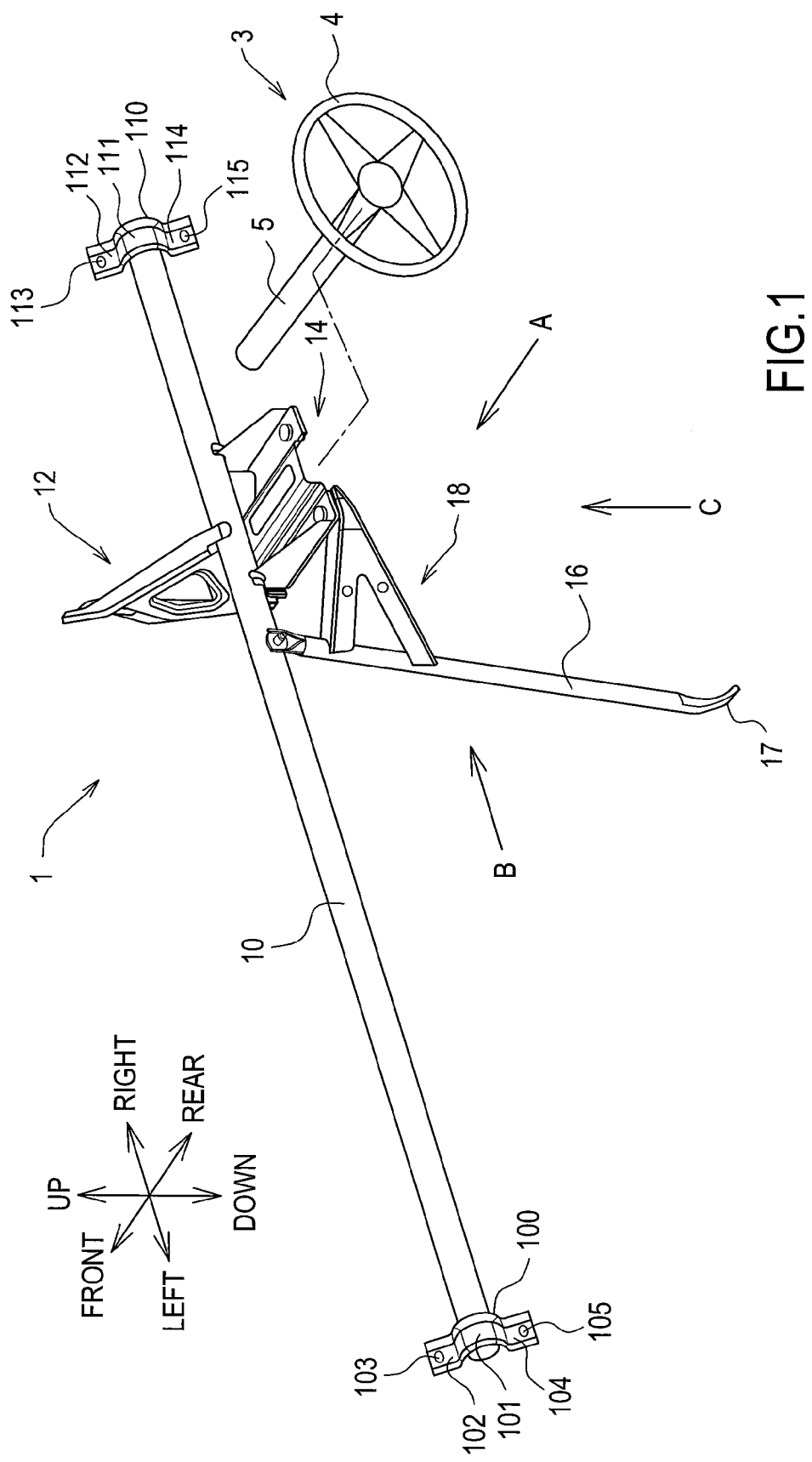
FIG. 1 is a schematic view of a support structure of the present invention.

In FIG. 1, a front-rear direction, a left-right direction, and an up-down direction are each indicated by arrows. The front-rear direction is a direction from a front toward a rear (or a direction from the rear toward the front) of a vehicle (not shown). The left-right direction is a vehicle width direction of the vehicle. The up-down direction is a vertical direction (a height direction of the vehicle).

A steering 3 of the vehicle comprises a steering wheel 4 and a steering column 5, and is supported by a support structure 1.

The steering wheel 4 is a known member that is held and operated by a driver.

The steering column 5 is connected to the steering wheel 4, and forms a part of a structure to transmit a steering operation of the steering wheel 4 to wheels (not shown).

The support structure 1 comprises an instrument panel reinforcement 10 of a pipe-like shape, a cowl-to-brace 12, a steering support bracket 14, a floor brace 16, and a bracket 18.

The instrument panel reinforcement 10 is arranged in the vehicle width direction (the left-right direction of the vehicle) inside an instrument panel (dashboard) (not shown) of the vehicle.

Specifically, both ends of the instrument panel reinforcement 10 are each fixed to a vehicle body frame (not shown) by means of mounting brackets 100 and 110. The mounting brackets 100 and 110 may be produced by press molding.

The mounting bracket 100 comprises an engaging portion 101 and flange portions 102 and 104. The engaging portion 101 and the flange portions 102 and 104 are integrally configured.

The engaging portion 101 has a semi-arc shape corresponding to a diameter (shape) of the instrument panel reinforcement 10 of a pipe-like shape, and is engageable with the instrument panel reinforcement 10. Specifically, an inner surface of a semi-arc shaped portion can be closely contacted with an outer surface of the instrument panel reinforcement 10.

The flange portion 102 has a mounting hole 103 formed therein, and the flange portion 104 has a mounting hole 105 formed therein. The mounting bracket 100 is fixed to the vehicle body frame by means of fastening members (not shown) such as bolts through the mounting holes 103 and 105. In this way, a left end of the instrument panel reinforcement 10 is fixed to the vehicle body frame.

The mounting bracket 110 has a similar structure. Specifically, the mounting bracket 110 comprises an engaging portion 111 and flange portions 112 and 114. The flange portion 112 has a mounting hole 113 formed therein, and the flange portion 114 has a mounting hole 115 formed therein. A right end of the instrument panel reinforcement 10 is fixed to the vehicle body frame by means of the mounting bracket 110.

The cowl-to-brace 12 is connected to the instrument panel reinforcement 10 and also connected to a not-shown member arranged inside the instrument panel (dashboard). This enables reduction of vibration of both the member and the instrument panel reinforcement 10.

Next, a specific explanation will be given of the steering support bracket 14, the floor brace 16, and the bracket 18 of the present invention with reference to FIG. 2 to FIG. 5 in addition to FIG. 1.

First, the steering support bracket 14 will be described. As shown in FIG. 1, the steering support bracket 14 is configured to be able to fix the steering column 5 of the steering 3.

Figure 2:
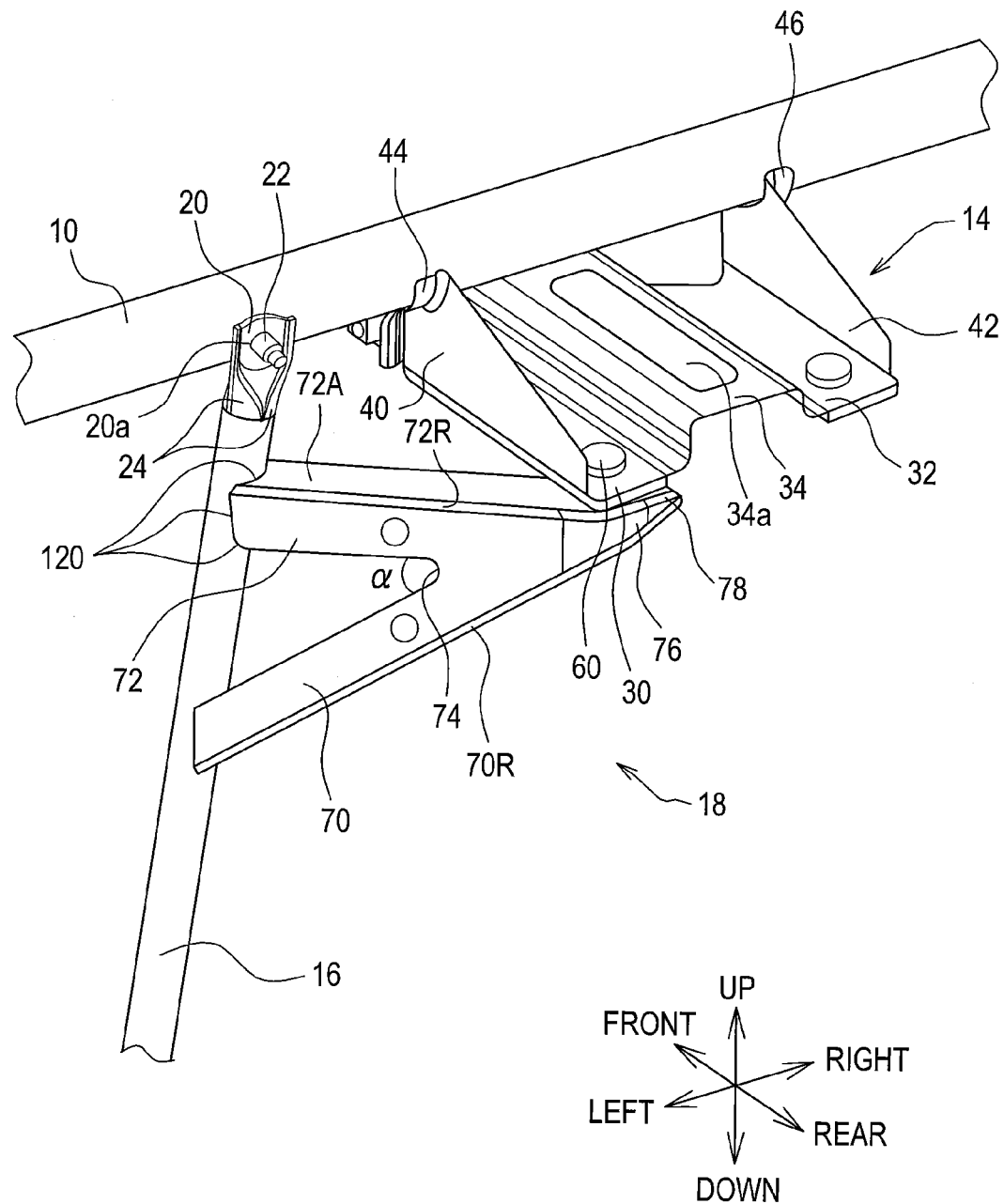
FIG. 2 is a perspective view showing details of a bracket of the present invention.

As shown in FIG. 2 and so on, the steering support bracket 14 comprises engaging portions 44 and 46, and is fixed to the instrument panel reinforcement 10 via the engaging portions 44 and 46. The engaging portions 44 and 46 each have a semi-arc shape corresponding to the diameter (shape) of the instrument panel reinforcement 10. This enables the engaging portions 44 and 46 to be closely contacted with the outer surface of the instrument panel reinforcement 10.

The steering support bracket 14 comprises side walls 40 and 42. The side walls 40 and 42 are continuous with the above-described engaging portions 44 and 46, respectively.

Provided between the side walls 40 and 42 is a receiving portion 34 capable of receiving the steering column 5. The receiving portion 34 has an elongated hole 34a formed therein (see FIG. 2 and FIG. 5).

Provide between the side wall 40 and the receiving portion 34 is a flat plate portion 30 so as to be continuous with the side wall 40 and the receiving portion 34. Similarly, a flat plate portion 32 is provide between the side wall 42 and the receiving portion 34 so as to be continuous with the side wall 42 and the receiving portion 34.

Next, the floor brace 16 will be described. As shown in FIG. 2, the floor brace 16 has a pipe-like shape, and is formed in an elongated manner. The floor brace 16 has, at one end thereof (an upper end side in FIG. 2), a flange portion 20 formed in an approximately plate-like shape. Provided between the flange portion 20 and a pipe-like-shaped body part of the floor brace 16 is a curved portion 24. The curved portion 24 has a curved shape so as to be continuous with the flange portion 20 and the pipe-like-shaped body part.

The flange portion 20 has a mounting hole 20a formed therein. The flange portion 20 and the instrument panel reinforcement 10 are fixed to each other by means of a fastening member 22 through the mounting hole 20a. Thus, the floor brace 16 and the instrument panel reinforcement 10 are fixed to each other.

Figure 4:
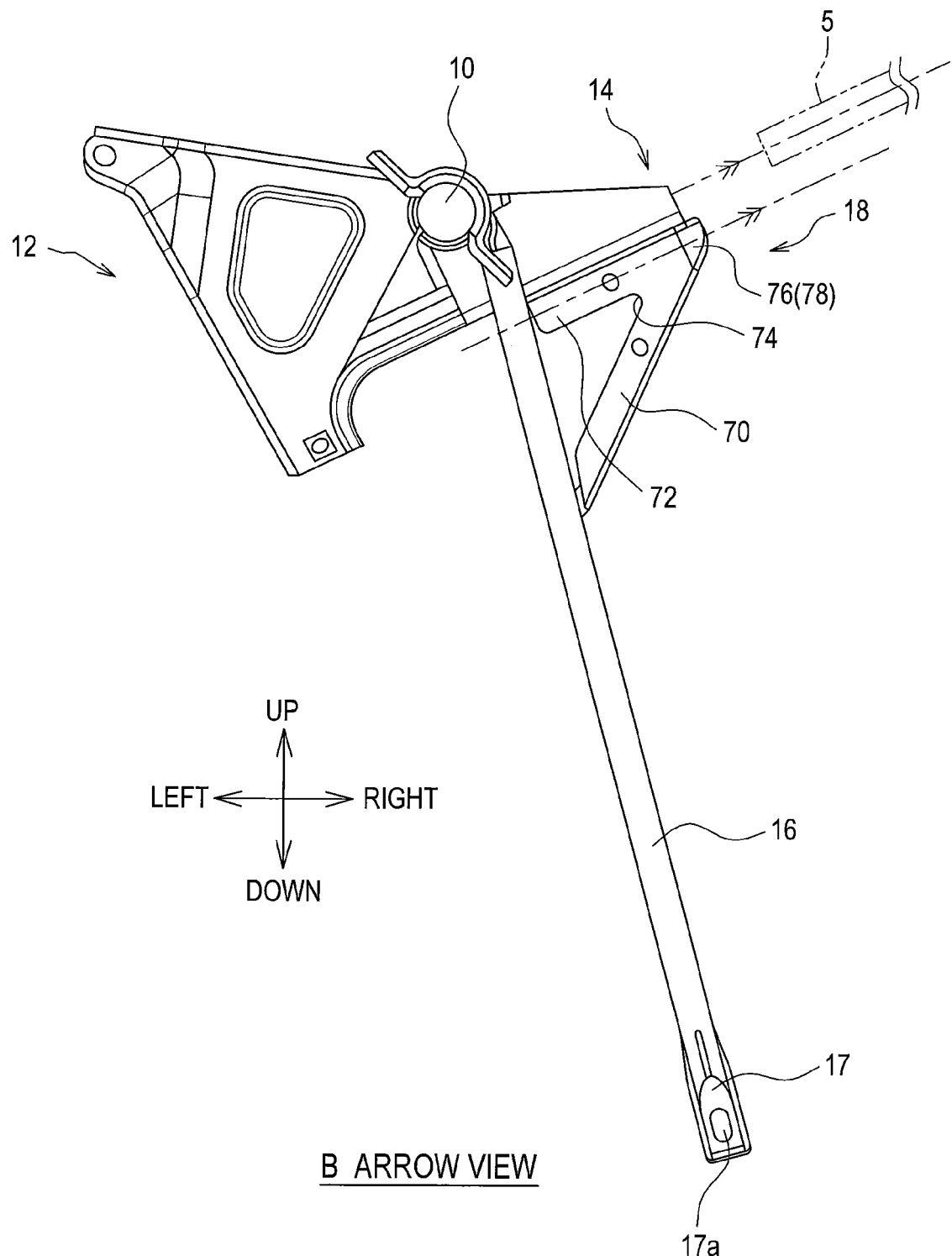
FIG. 4 is a view seen from a direction of an arrow B in FIG. 1.

The floor brace 16 has, at a lower end side thereof, a fixed end 17 (see FIG. 4). The fixed end 17 has a fastening hole 17a formed therein. The fixed end 17 is fixed to a floor frame of a vehicle body by means of a fastening member (not shown) through the fastening hole 17a.

As above, the floor brace 16 is connected, at the upper end side thereof, to the instrument panel reinforcement 10, and is fixed, at the lower end side thereof, to the floor frame of the vehicle body. This enables the instrument panel reinforcement 10 to be supported by the floor brace 16.

Next, the bracket 18 will be described. The bracket 18 is a bracket that can be produced by press molding, for example. In FIG. 2 to FIG. 5, reference numerals are assigned to specific portions of the bracket 18 for the sake of explanatory convenience. However, the bracket 18 of the present embodiment is not configured with a plurality of parts, and is preferred to be integrally formed. Nevertheless, a possibility that the bracket 18 is configured with the plurality of parts is not excluded. That is, it can be understood that to configure the bracket 18 with the plurality of parts is also within the scope of the present invention.

The bracket 18 is configured to have an approximately triangular shape when viewed from the side (see a B arrow view: FIG. 4).

Specifically, as shown in FIG. 2 and FIG. 4, the bracket 18 is configured such that a dimension of the bracket 18 in the up-down direction becomes smaller from a side closer to the floor brace 16 toward a side closer to the steering support bracket 14.

The bracket 18 comprises a lower spanning portion 70 and an upper spanning portion 72, and is configured to have a bifurcated shape formed of the lower spanning portion 70 and the upper spanning portion 72.

The lower spanning portion 70 and the upper spanning portion 72 are spaced farthest away from each other at the side closer to the floor brace 16, and the space between the lower spanning portion 70 and the upper spanning portion 72 becomes smaller gradually toward the side closer to the steering support bracket 14.

In the bracket 18, a portion to be connected to the steering support bracket 14 is indicated as a connection end 78. The connection end 78 is configured such that a thickness thereof becomes gradually smaller correspondingly to the configuration in which the space between the lower spanning portion 70 and the upper spanning portion 72 becomes smaller from the side closer to the floor brace 16 toward the side closer to the steering support bracket 14.

Figure 5:
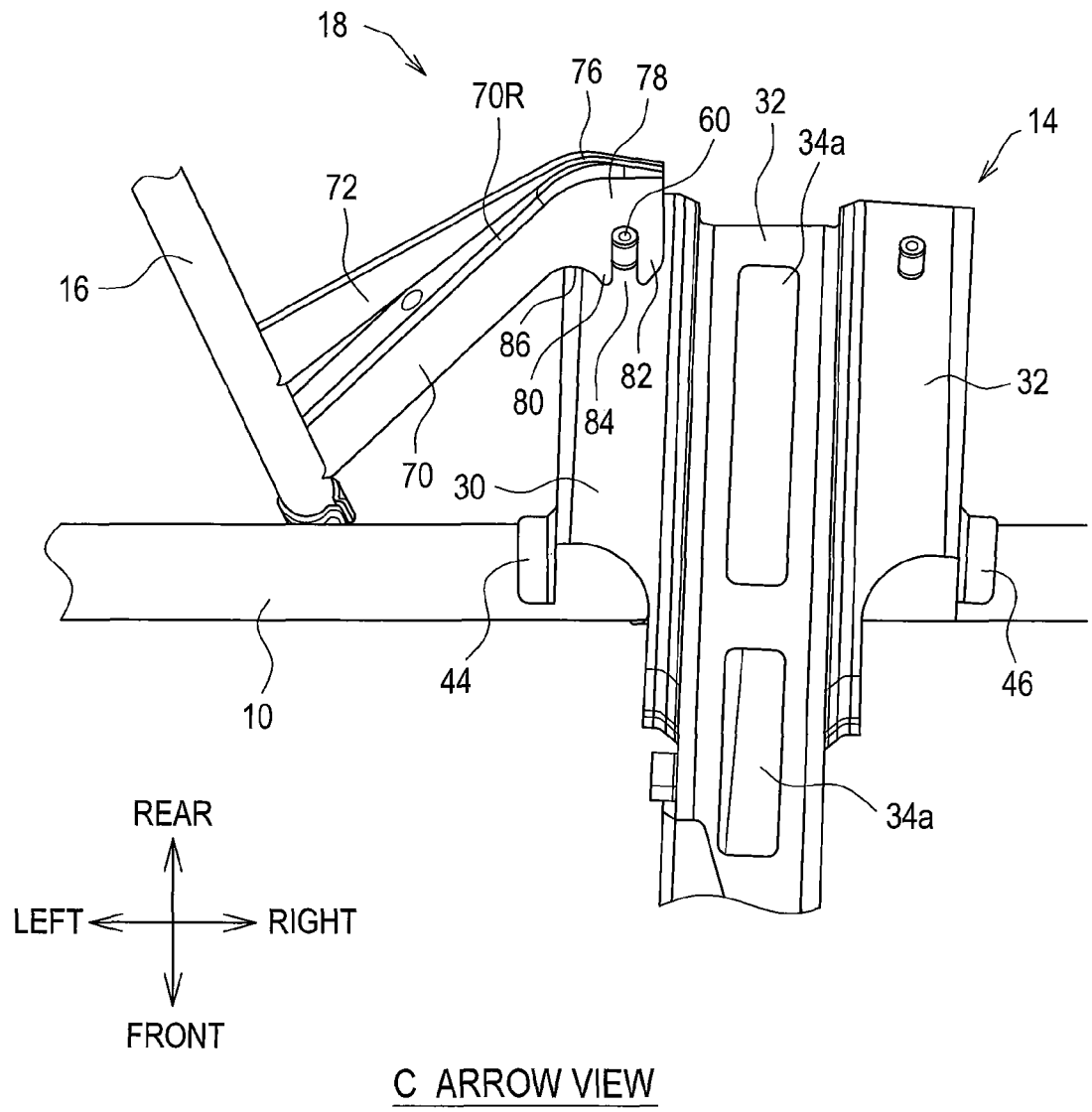
FIG. 5 is a view seen from a direction of an arrow C in FIG. 1.

The connection end 78 is fixed to the flat plate portion 30 of the steering support bracket 14 via a fastening member 60 (see FIG. 2 and FIG. 5). Specifically, as shown in FIG. 5, the connection end 78 has, at a backside thereof, an engaging portion 84 formed therein engaging with the fastening member 60. The engaging portion 84 is configured to comprise end portions 80 and 82 forming a bifurcated shape so as to be able to receive the fastening member 60. The fastening member 60 comprises a threaded portion 60a (see FIG. 3), and can thereby be engaged with a not-shown nut.

As shown in FIG. 5, a portion leading from the lower spanning portion 70 to the end portion 80 is indicated as an arc portion 86. The arc portion 86 has an arc shape. On the other hand, a portion leading from the lower spanning portion 70 and the upper spanning portion 72 to the connection end 78 is indicated as an arc portion 76. The arc portion 76 has an arc shape.

As shown in FIG. 1 to FIG. 5, the lower spanning portion 70 and the upper spanning portion 72 each have a linear shape, and are curved at, so to speak, a junction thereof (a portion indicated as the arc portion 76 or the arc portion 86) (see especially FIG. 5), to thereby allow the connection end 78 to reach a rear end side of the flat plate portion 30 of the steering support bracket 14.

One of angles formed by the lower spanning portion 70 and the upper spanning portion 72, which is an acute angle α (see FIG. 2), is preferred to have a value in the range of 15 degrees to 80 degrees, for example. More preferably, the angle α is 75 degrees. An explanation in this regard will be given later with reference to FIG. 6.

An inner edge portion 74 formed by the lower spanning portion 70 and the upper spanning portion 72 has an arc shape. Since the angle α formed by the lower spanning portion 70 and the upper spanning portion 72 is acute, it is supposed that a stress is likely to concentrate on the inner edge portion 74. However, due to the inner edge portion 74 being formed in an arc shape, such concentration of the stress on a specific part of the inner edge portion 74 is reduced. Thus, the bracket 18 can be inhibited from being damaged.

One end of the lower spanning portion 70, which end is on the opposite side of the connection end 78, is connected to the floor brace 16 at a position lower than the connection end 78. Thus, the lower spanning portion 70 connects the floor brace 16 and the steering support bracket 14 to each other in such a manner that the lower spanning portion 70 is spanned obliquely upward from the floor brace 16 to the steering support bracket 14 between the floor brace 16 and the steering support bracket 14.

Figure 3:
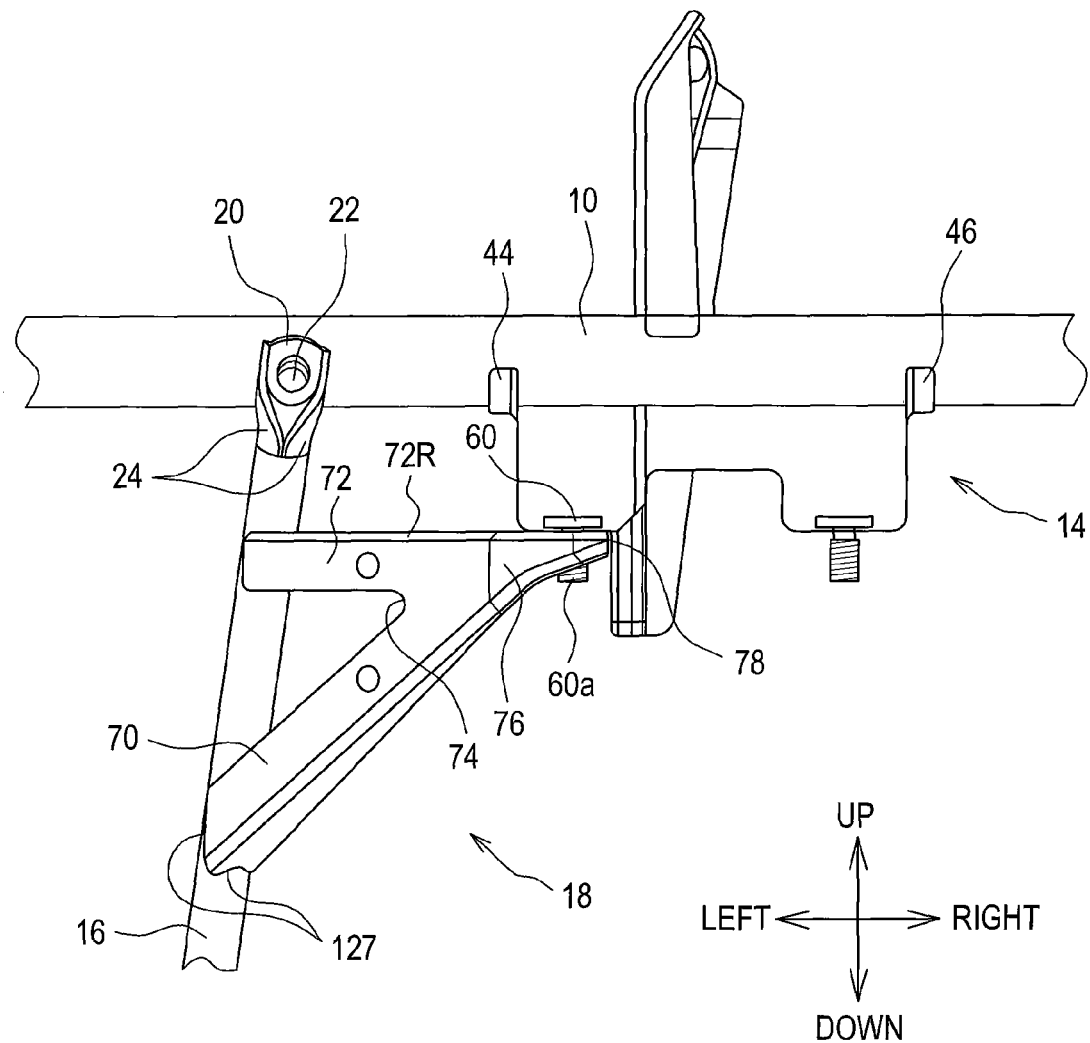
FIG. 3 is a view seen from a direction of an arrow A in FIG. 1.

As seen in FIG. 3, an edge portion 127 is shown at the one end of the lower spanning portion 70. The edge portion 127 has a curved shape corresponding to a shape (pipe-like shape) of the floor brace 16 so as to be able to be closely contacted with an outer periphery of the floor brace 16. The lower spanning portion 70 has a chamfered portion 70R formed thereon (see FIG. 2).

Similarly, one end of the upper spanning portion 72, which end is on the opposite side of the connection end 78, is connected to the floor brace 16 at a position higher than the one end of the lower spanning portion 70 and slightly lower than the connection end 78. Thus, the upper spanning portion 72 connects the floor brace 16 and the steering support bracket 14 to each other in such a manner that the upper spanning portion 72 is spanned at a shallower angle (smaller angle) than that of the lower spanning portion 70 between the floor brace 16 and the steering support bracket 14.

More specifically, in the present embodiment, an arrangement angle of the upper spanning portion 72 is designed to be in parallel to an arrangement angle of the steering column 5. As shown in FIG. 4, the steering column 5 is supported by the steering support bracket 14 in parallel to the upper spanning portion 72 (more specifically, received and fixed by the receiving portion 34 of the steering support bracket 14).

An upper surface 72A (see FIG. 2) of the upper spanning portion 72 has a planar shape. The upper surface 72A can be closely contacted with the flat plate portion 30 (specifically, with a not-shown back surface of the flat plate portion 30).

The one end of the upper spanning portion 72 has an edge portion 120 formed therein as shown in FIG. 2. The edge portion 120 has a curved shape corresponding to the shape (pipe-like shape) of the floor brace 16 so as to be able to be closely contacted with the outer periphery of the floor brace 16. The upper spanning portion 72 has a chamfered portion 72R formed thereon.

The bracket 18 is provided to the support structure 1 in such a manner that at least part of the lower spanning portion 70 is located in a region approximately corresponding to a position (height) of knees of the driver sitting on a driver's seat of the vehicle.

Thus, in the support structure 1 of the present embodiment, the bracket 18 (the lower spanning portion 70 of the bracket 18) can also function as a protection member that protects the knees of the driver at the time of collision of the vehicle, for example.

Figure 6:
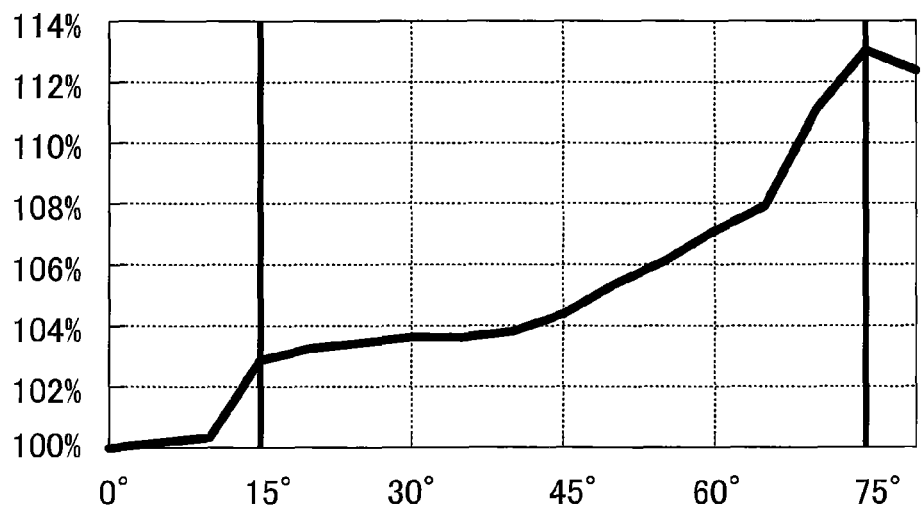
FIG. 6 contains diagrams showing effects of the present invention.

FIG. 6 shows a relationship between the angle α formed by the lower spanning portion 70 and the upper spanning portion 72 and stiffness. Specifically, FIG. 6 shows results of simulation analysis of stiffness values measured while varying the angle α variously and effects thereof (degrees of improvement of the stiffness values).

Here, the stiffness value refers to a value of "load/amount of displacement" at the time the load is vertically applied to a portion, in the steering column 5, in the vicinity of a position onto which the steering wheel 4 is mounted. In this example, the load set in advance was applied, and the amount of displacement at that time was measured. Then, the load was divided by the amount of displacement to obtain the stiffness value (N/mm).

In FIG. 6, 0 degree refers to a case in which the angle α formed by the lower spanning portion 70 and the upper spanning portion 72 is 0 degree. In other words, 0 degree may be understood as a case where the bracket 18 has a structure like a single bar.

In this case, the amount of displacement at the time the specified load was applied was 0.00572 mm, and a value of 175 N/mm was obtained as the stiffness value. On the basis of these results, performance effects (N/mm) and effects (%) are shown.

When the angle α was 5 degrees and 10 degrees, no remarkable improvement was observed as to the performance effect (N/mm) and the effect (%).

When the angle α was 15 degrees, the stiffness value was 180 N/mm, the performance effect (N/mm) was 5 N/mm, and the effect was 103%, which means exertion of a specific effect.

Until the angle α was increased up to 75 degrees, the values of the performance effect (N/mm) and the effect (%) continued to increase. When the angle α was 75 degrees, the performance effect (N/mm) and the effect (%) were maximized, i.e., 23 N/mm and 113%, respectively.

When the angle α was 80 degrees, decrease in the performance effect (N/mm) and the effect (%) was observed compared with the case where the angle α was 75 degrees. It is to be noted that, in a case where the angle α is larger than 80 degrees, the lower spanning portion 70 is supposed, computationally, to reach the floor frame of the vehicle body before reaching the floor brace 16, and thus, the lower spanning portion 70 cannot be fixed to the floor brace 16 any more. That is why no analysis is performed for such a case.

In the present embodiment, from among the lower spanning portion 70 and the upper spanning portion 72, the upper spanning portion 72 connects the floor brace 16 and the steering support bracket 14 to each other at a more horizontal angle, and the lower spanning portion 70 connects the floor brace 16 and the steering support bracket 14 to each other at a more vertical angle than the upper spanning portion 72.

As above, based on the analysis results shown in FIG. 6, when the angle α is 15 degrees to 80 degrees, an effect is observed that support stiffness (support stiffness of the steering support bracket 14 or support stiffness of the steering column 5) can be improved, and it can be understood that, when the angle α is 75 degrees, especially, such an effect is maximized.

According to the bracket 18 of the present invention, in the upper spanning portion 72, a resistance to some external force in a horizontal direction (the front-rear direction or the left-right direction of the vehicle) is stronger, and thus, the upper spanning portion 72 is supposed to be able to contribute to an improved support stiffness in the horizontal direction (support stiffness of the steering support bracket 14 and support stiffness of the steering column 5).

On the other hand, in the lower spanning portion 70, a resistance to some external force in the vertical direction (the height direction of the vehicle) is stronger, and thus, the lower spanning portion 70 is supposed to be able to contribute to an improved support stiffness in the vertical direction (support stiffness of the steering support bracket 14 and support stiffness of the steering column 5).

That is, according to the bracket 18 of the present invention, support stiffness in the horizontal direction and support stiffness in the vertical direction can be improved simultaneously and, especially, the both support stiffnesses can be improved in a balanced manner. Thus, an inhibiting effect on vibration of the steering wheel 4 can be further enhanced.

One embodiment of the present invention has been described above. However, the present invention is not limited to the above-described embodiment, and can take various forms within the technical scope of the present invention.

For example, the bracket 18 may have a shape not bifurcated into the lower spanning portion 70 and the upper spanning portion 72 (a shape in which no space is arranged between the lower spanning portion 70 and the upper spanning portion 72) while an outer shape of the bracket 18 is maintained to the shape in the above embodiment.

In other words, the desired effect can be obtained as long as the bracket 18 is formed in a triangle-like shape tapered from the side closer to the floor brace 16 toward the side closer to the steering support bracket 14.

In addition, a cross-sectional dimension of the lower spanning portion 70 and a cross-sectional dimension of the upper spanning portion 72 may vary from place to place. In other words, the lower spanning portion 70 and the upper spanning portion 72 do not necessarily have to have a uniform dimension throughout the entirety thereof in a longitudinal direction.

The invention claimed is:

1. A bracket used in a support structure for a steering column,
wherein the support structure comprises:
an instrument panel reinforcement arranged spanning in a vehicle width direction of a vehicle;
a steering support bracket for fixing a steering column of the vehicle to the instrument panel reinforcement; and
a floor brace fixed at an upper end thereof to the instrument panel reinforcement or to the steering support bracket, and fixed at a lower end thereof to a floor of the vehicle,
wherein the bracket is configured to be arranged spanning between the steering support bracket and the floor brace, the bracket comprising:
a first portion arranged between the steering support bracket and the floor brace at a first angle with respect to horizontality;
a second portion arranged between the steering support bracket and the floor brace at a second angle, which is different from the first angle; and
a connection portion to be connected to the steering support bracket, wherein the bracket has a bifurcated shape that is bifurcated from the connection portion into the first portion and the second portion.

2. The bracket according to claim 1,
wherein the first portion and the second portion form a configuration bifurcated at an angle in a range of 15 degrees to 80 degrees therebetween.

3. The bracket according to claim 1, wherein the first angle is parallel to the steering column.

4. The bracket according to claim 1, wherein at least part of the second portion is configured to be arranged in a region corresponding to a position of knees of a driver sitting on a driver's seat of the vehicle.

5. The bracket according to claim 1, wherein the first portion has a linear shape.

6. The bracket according to claim 1, wherein the second portion has a linear shape.

7. A support structure that supports a steering column of a vehicle, the support structure comprising:
an instrument panel reinforcement arranged spanning in a vehicle width direction of a vehicle;
a steering support bracket for fixing the steering column to the instrument panel reinforcement;
a floor brace fixed at an upper end thereof to the instrument panel reinforcement or to the steering support bracket, and fixed at a lower end thereof to a floor of the vehicle; and
a bracket configured to be arranged spanning between the steering support bracket and the floor brace, the bracket comprising:
a first portion arranged between the steering support bracket and the floor brace at a first angle with respect to horizontality,
a second portion arranged between the steering support bracket and the floor brace at a second angle, which is different from the first angle; and
a connection portion to be connected to the steering support bracket, wherein the bracket has a bifurcated shape that is bifurcated from the connection portion into the first portion and the second portion.

* * * * *